Patented Dec. 7, 1937

2,101,633

UNITED STATES PATENT OFFICE 2,101,633

FOOD PRODUCT AND PROCESS FOR MAKING SAME

Randall Whitaker, Samuel M. Weisberg, and Luther D. Hilker, Baltimore, Md., assignors to Sealtest System Laboratories, Inc., New York, N. Y., a corporation of Maryland No Drawing. Application August 26, 1935, Serial No. 38,004

16 Claims. (Cl. 99—20)

The present invention relates to a food product in wafer or chip-like form containing a high percentage of protein. In referring to high protein content, we mean a substantial amount of protein, e. g., casein, in the neighborhood of thirty-three per cent by weight is present as compared with the protein content of somewhat similar products, for example, potato chips which usually contain less than ten per cent protein.

The chip or wafer is particularly characterized by possessing a pleasing, distinctive taste and appetizing appearance, and is of crisp texture and attractive, somewhat crinkled contour.

A feature of the invention is the production of a wafer or chip-like product of the type described which is substantially dry or dehydrated, and wherein the protein present is preferably in a peptized state. This is advantageous in that the protein is uniformly dispersed, and serves as a bond for maintaining the structure of the product, as well as acts as a dispersing agent for the other ingredients, whereby they are uniformly distributed and the product is rendered homogeneous.

In addition to high nutritional value and excellent palatability, the product is easily digestible. It is a further important feature of the invention that the wafer or chip contains "complete protein", e. g., casein, known to be easily digestible. By "complete protein" is meant one that contains substantially all of the amino acids needed to make it desirable for nutrition.

We have, moreover, found that the nutritional value of the product is enhanced by the use of hydrolyzed protein, e. g., casein, which contains the original amino acids of the protein and in such form that they are readily assimilated; at the same time, the presence of the hydrolyzed casein helps to impart a desirable appearance and taste to the product.

In carrying out the invention, we mix, preferably in unheated condition, substantially dry proteins, e. g., casein, with carbohydrates, glutinous substances or mixtures thereof, for example, wheat and/or soy bean flour, and thereafter add to the mixture a suitable quantity of water. This water may be supplied, however, in part or in its entirety by the addition of an aqueous solution of a nutritional and flavor-imparting material such as hydrolyzed casein, or any suitable aqueous flavoring material, and/or by means of an alkaline solution, the alkali acting as a dispersing agent as well as to adjust the pH of the mixture. While it is preferred to accomplish these mixing operations at normal temperature and pressure, heating may be resorted to.

In referring to casein, we mean animal casein such as that produced from milk, for example, muriatic, sulphuric, lactic or rennet casein; or vegetable casein such as that obtained, for example, from soy beans.

The carbohydrates and glutinous substances, in addition to wheat and soy bean flour, either of which may of course be used alone, include potato flour, oat flour, as well as starches, such as corn starch, potato starch, arrow root, and also dextrines, e. g., corn dextrine.

The quantity of water present in the mixture will be varied in accordance with the process to be followed in the manufacture of the final product. That is, the mixture is of mealy or mush-like appearance and of any desired water content. This mush-like mass is heated and converted into a colloidal dispersion having a consistency or viscosity according to the amount of water present. For example, one such colloidal dispersion having a relatively substantial amount of water has, when hot, a viscosity substantially that of strained honey at normal temperature. This colloidal dispersion forms a congealed mass on cooling. As another example, where a lesser amount of water is used, the colloidal dispersion, when hot, has a substantially greater viscosity and on cooling assumes a plastic state so that it may be formed into thin sheets or strips. As a further example, where there is present even less water, the colloidal dispersion, when hot, does not flow, and upon cooling, is sliceable.

In referring to hydrolyzed protein, we mean to include such hydrolyzed proteins as may be derived from casein, rice, gelatin and albumen. The hydrolyzed protein is preferably added as an aqueous solution.

The alkali which is added to the mixture has the functions (1) of peptizing the proteins so that they are brought to a state of colloidal dispersion which results in a homogeneous final product and (2) also serves to adjust the pH of the dispersion. The pH of the final dispersion is preferably adjusted to substantially 7.0 to 8.5 and for most cases will range between 8.0 to 8.2.

The alkalies which may be employed are, of course, any which are non-toxic, and include the hydroxides, and soluble carbonates of the alkali and alkali earth metals, as well as alkaline salts. For example, we can use sodium hydroxide, potassium hydroxide, calcium hydroxide, and normal phosphates, such as tri-sodium phosphate. Particularly, however, we use a solution of ammonia as the protein peptizing agent and for adjusting the pH.

The colloidal dispersion of the proteins in turn acts to disperse and/or suspend the remaining ingredients of the mixture when heated as described above, and there is produced in all cases a homogeneous mass from which the chips are made.

As an example of the manufacture of the wafer or chip-like product of this invention, ten parts of wheat flour and ten parts of soy bean flour are mixed with sixteen parts of substantially dry muriatic casein. To this mixture there is added substantially sixty-two parts of aqueous solution, composed of substantially forty-five parts of water, fifteen parts of hydrolyzed casein solution, and two parts dilute aqueous ammonia. Of course, the water may be wholly incorporated in the mixture as part of a solution of hydrolyzed casein or wholly as part of a solution of ammonia, or it may be separately added. That is to say, a solution containing hydrolyzed casein and ammonia and the required quantity of water may be added to the mixture or separate solutions of these ingredients may be added to the mixture with added water if necessary, or the ingredients may be added dry and water added as required to produce the desired final colloidal dispersion.

The mush-like mixture is heated to a temperature of substantially 180° F. until it possesses a homogeneous appearance characteristic of a colloidal dispersion and has the consistency of heavy molasses. It is then removed in heated state from the treating vessel and allowed to cool under normal atmospheric conditions, whereupon the product becomes plastic and may be formed into thin sheets or strips of suitable thickness for the manufacture of our wafer or chip-like product. Preferably this forming operation into sheets or strips is carried on while the mass is so cooling. The sheet or strip of plastic material is now cut in any suitable manner to produce a multiplicity of relatively thin small units of any desired shape in accordance with the particular contour of wafer or chip desired.

The units so formed are permitted to dry in the air or under a mild heat or by circulating ordinary air over the surface thereof. In some cases, dehumidified air is used for drying; vacuum drying may also be resorted to. The drying operation results in a substantially dehydrated unit or disc which is formed into the final product by a heating step, preferably by frying in a suitable oil or fat. If desired, the dried discs or units may be safely stored and shipped to distant points where they may then be heat treated or fried.

The thickness of the dried units or discs prior to heat treating or frying is made such that at the given temperature used for heating, no raw spots remain on the final treated chip. The unit and the resultant chip made therefrom are therefore relatively thin, comparable in general to potato chips.

In producing the final product, the units, as just described, are preferably fried by immersion in a suitable hot oil or fat at a temperature of substantially 325° to 415° F. and for this purpose any stable oil or fat, such as "Crisco", coconut oil, butter, butter oil, peanut oil, cotton seed oil, sesame oil, soy bean oil, or olive oil may be used. Frying at 400° to 410° F. is accomplished in a few seconds while frying at 330° to 340° F. requires a little longer time.

During the frying operation, the disc or unit increases somewhat in size, adsorbs some oil or fat, and the final chip is of crisp texture, golden brown in color, and crinkled or of irregular contour, substantially after the manner of so-called potato chips.

In some cases, by further decreasing the water content over that described above, a plastic dispersed product is obtained which, as stated, has the consistency, when cold, of pasteurized blended cheese. This product we preferably prepare in cylinder or block form and slice into discs of suitable size, which are then dried as described, and heat treated or fried, as just described, to form the final chip or wafer.

Where the most dilute aqueous mixture is prepared, and a colloidal dispersion resembling honey in viscosity is obtained, it is preferable to flow the same in small increments while heated so as to have the desired viscosity and form spaced discs of desired size upon a smooth, clean, unheated or cooled and preferably greased surface where the fluid mass congeals at room temperature or lower temperature in the form of discs of any suitable size, shape and thickness. Such discs or units are dried as described above, and thereafter subjected to a heating or frying step, as heretofore recited.

The chips or wafers may have incorporated therein various flavors and aroma producing materials of a nature to enhance the nutritive value of the chip and to blend readily with the heretofore recited ingredients of the chip. Among such substances are beef extract, liver extract, tomato concentrates, cheeses such as "American" cheese, "Roquefort" cheese, or in general cheeses having rather pronounced flavor.

An analysis of our relatively thin, heat treated or fried, curly or crinkled, substantially dry casein chips of crisp texture and somewhat irregular contour reveals a protein content of approximately thirty-three per cent, and a carbohydrate content of about fifteen per cent. A similar analysis of a representative sample of potato chips discloses a protein content of approximately six per cent and a carbohydrate content of about fifty-two per cent.

The invention may take various forms and modifications, all of which are comprehended in the appended claims.

We claim:—

1. A heat-treated edible product in substantially dehydrated state, having a wafer or chip-like form of crisp texture and containing casein in amount to constitute a bond for maintaining the structure of the product.

2. A heat-treated edible product in substantially dehydrated state, having a wafer or chip-like form of crisp texture and containing casein in amount to constitute a bond for maintaining the structure of the product and hydrolyzed protein.

3. A heat-treated edible product in substantially dehydrated state, having a wafer or chip-like form and of crisp texture and containing peptized casein in amount to constitute a bond for maintaining the structure of the product.

4. A heat-treated edible product in substantially dehydrated state, having a wafer or chip-like form and of crisp texture and containing casein in amount to constitute a bond for maintaining the structure of the product and a carbohydrate.

5. A heat-treated edible product in substantially dehydrated state, having a wafer or chip-like form and of crisp texture and containing casein in amount to constitute a bond for maintaining the structure of the product and glutinous material.

6. A heat-treated edible product in substantially dehydrated state, having a wafer or chip-like form and of crisp texture and containing casein in amount to constitute a bond for maintaining the structure of the product, a carbohydrate, and glutinous material.

7. A heat-treated edible product in substantially dehydrated state, having a relatively thin wafer or chip-like form and of crisp texture and substantially curly contour and containing casein in amount to constitute a bond for maintaining the structure of the product, a carbohydrate, glutinous material, and fat.

8. A heat-treated edible product in substantially dehydrated state, having a relatively thin wafer or chip-like form and of crisp texture and substantially curly contour and containing casein in amount to constitute a bond for maintaining the structure of the product, a carbohydrate, glutinous material, a fat, and a flavoring material.

9. A heat-treated edible product in substantially dehydrated state, having a wafer or chip-like form and of crisp texture and containing casein in amount to constitute a bond for maintaining the structure of the product, a carbohydrate, glutinous material, a fat, and hydrolyzed protein.

10. The process of preparing an edible wafer or chip-like product which comprises forming of a composition including a colloidal dispersion of peptized casein in amount to constitute a bond for maintaining the structure of the product, forming the same into wafer or chip-like units, and heat-treating the units to produce a wafer or chip of crisp texture.

11. The process of preparing an edible wafer or chip-like product which comprises forming a composition containing a colloidal dispersion of peptized casein in amount to constitute a bond for maintaining the structure of the product, and a carbohydrate, forming the same into wafer or chip-like units, and heat-treating the units to produce a wafer or chip of crisp texture.

12. The process of preparing an edible wafer or chip-like product which comprises forming a composition containing a colloidal dispersion of peptized casein in amount to constitute a bond for maintaining the structure of the product and glutinous material, each in a peptized state, forming the same into wafer or chip-like units, and heat-treating the units to produce a wafer or chip of crisp texture.

13. The process of preparing an edible wafer or chip-like product which comprises forming a composition containing a colloidal dispersion, a peptized casein in amount to constitute a bond for maintaining the structure of the product, forming the same into wafer or chip-like units, drying the units, and heat-treating the units to produce a wafer or chip of crisp texture.

14. The process of preparing an edible wafer or chip-like product which comprises mixing casein, a carbohydrate and glutinous material and a flavoring material, dispersing the casein and adjusting the pH of the mixture with an alkaline material and forming a colloidal dispersion having a pH of substantially 7.0 to 8.5, forming the mixture into wafer or chip-like units and heat treating the units to produce a wafer or chip of crisp texture.

15. A heat-treated, edible product in substantially dehydrated state, having a wafer or chip-like form of crisp texture and containing casein in amount to constitute a bond for maintaining the structure of the product, and a flavor.

16. An edible product comprising a composition containing peptized casein in amount sufficient to act as a dispersing agent, and at least one of a group of compounds consisting of carbohydrates and glutinous materials, said composition having a pH of substantially 7.0 to 8.5.

RANDALL WHITAKER.
SAMUEL M. WEISBERG.
LUTHER D. HILKER.